(12) United States Patent
Halcom et al.

(10) Patent No.: US 8,480,065 B2
(45) Date of Patent: Jul. 9, 2013

(54) ELASTOMERIC SPRING-DAMPER WITH INTEGRAL STOPS

(75) Inventors: Lancer D. Halcom, Lewisville, TX (US); Brian Bouquillon, Mesquite, TX (US); David A. Haynie, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 1057 days.

(21) Appl. No.: 11/910,951

(22) PCT Filed: Apr. 20, 2006

(86) PCT No.: PCT/US2006/015325
§ 371 (c)(1),
(2), (4) Date: Oct. 8, 2007

(87) PCT Pub. No.: WO2006/116224
PCT Pub. Date: Nov. 2, 2006

(65) Prior Publication Data
US 2008/0191401 A1    Aug. 14, 2008

Related U.S. Application Data

(60) Provisional application No. 60/675,361, filed on Apr. 27, 2005.

(51) Int. Cl.
*F16F 7/00* (2006.01)
*F16F 1/44* (2006.01)
*B60G 11/22* (2006.01)

(52) U.S. Cl.
USPC .................................. 267/293; 267/141.5

(58) Field of Classification Search
USPC ............... 267/141.4, 141.5, 292, 293, 141.2, 267/69–74, 136
See application file for complete search history.

(56) References Cited

U.S. PATENT DOCUMENTS

| 2,407,588 | A |   | 9/1946 | Thiry |  |
|---|---|---|---|---|---|
| 5,062,654 | A | * | 11/1991 | Kakimoto et al. | 280/124.136 |

(Continued)

FOREIGN PATENT DOCUMENTS

| DE | 4237248 A1 | 5/1993 |
|---|---|---|
| EP | 1321319 A1 | 6/2003 |

(Continued)

OTHER PUBLICATIONS

Dennis P. McGuire, High Stiffness ('Rigid') Helicopter Pylon Vibration Isolation Systems, paper presented at the American Helicopter Society 59th Annual Forum, Phoenix, Arizona, May 6-8, 2003.

(Continued)

*Primary Examiner* — Bradley King
*Assistant Examiner* — Vishal Sahni
(74) *Attorney, Agent, or Firm* — James R. Walton; Richard G. Eldredge (57) ABSTRACT

An elastomeric spring-damper has a one-piece tubular body having an integral cap. A tension stop flange is formed in the body near the cap portion, and a compression stop flange opposing the tension stop flange is formed on the cap portion. An inner member located within the body is coupled to the body with an annular elastomeric member, such that longitudinal motion of the inner member relative to the body is allowed through elastic deformation of the elastomeric member. An inner member stop flange is positioned between the compression stop flange and the tension stop flange to limit longitudinal motion of the inner member relative to the body.

5 Claims, 4 Drawing Sheets

U.S. PATENT DOCUMENTS

| | | | | |
|---|---|---|---|---|
| 5,261,748 A | * | 11/1993 | Kameda | 384/222 |
| 6,170,812 B1 | * | 1/2001 | Nicoles | 267/281 |
| 6,616,130 B2 | * | 9/2003 | Hokazono et al. | 267/141.1 |
| 6,709,046 B2 | | 3/2004 | Obazawa et al. | |
| 2004/0017034 A1 | * | 1/2004 | Asano et al. | 267/141.2 |

FOREIGN PATENT DOCUMENTS

| | | |
|---|---|---|
| GB | 2043574 A | 5/2009 |
| JP | 52127191 A | 10/1977 |
| JP | 59105521 U | 7/1984 |
| JP | 2007069238 A | 3/2007 |
| JP | 2007190132 A | 8/2007 |
| WO | 03042567 A2 | 5/2003 |

OTHER PUBLICATIONS

CA Office Action, Nov. 19, 2009.

European Office Action dated Apr. 27, 2010 from corresponding European Application No. 06751131.1-1264.

Japanese Office Action dated May 10, 2011 from corresponding Japenese Application No. 2008-508971.

Extended European Search Report dated Jun. 8, 2011 from corresponding European Application No. 06751131.1.

Chinese Office Action dated Aug. 31, 2011 from corresponding Chinese Application No. 200680023166.9.

* cited by examiner

ELASTOMERIC SPRING-DAMPER WITH INTEGRAL STOPS

TECHNICAL FIELD

The present invention relates generally to elastomeric devices and relates particularly to elastomeric springs, dampers, and combination spring-dampers.

DESCRIPTION OF THE PRIOR ART

Elastomeric spring assemblies, damper assemblies, and combination spring-damper assemblies have been around for many years and come in various shapes and sizes. The assemblies typically have an outer housing and an inner member, the housing and inner member each being adapted for connection to one of a pair of components that have relative motion between them. A resilient elastomeric member disposed between the outer housing and the inner member provides a spring force opposing movement in the tension and compression directions and damps relative motion between the inner member and the housing. The spring force and damping force cooperate to resist and damp the relative motion between the components connected to the assembly.

An assembly having an elastomeric member with a very low damping rate may be referred to as a spring, whereas an assembly having a very high damping rate may be referred to as a damper. An assembly having a damping rate between those of the springs and dampers may be referred to as a spring-damper, which acts in both capacities. For ease of description, the assembly described in this section is referred to as a spring-damper, though the description can also be applied to elastomeric springs and dampers.

Figure 1:
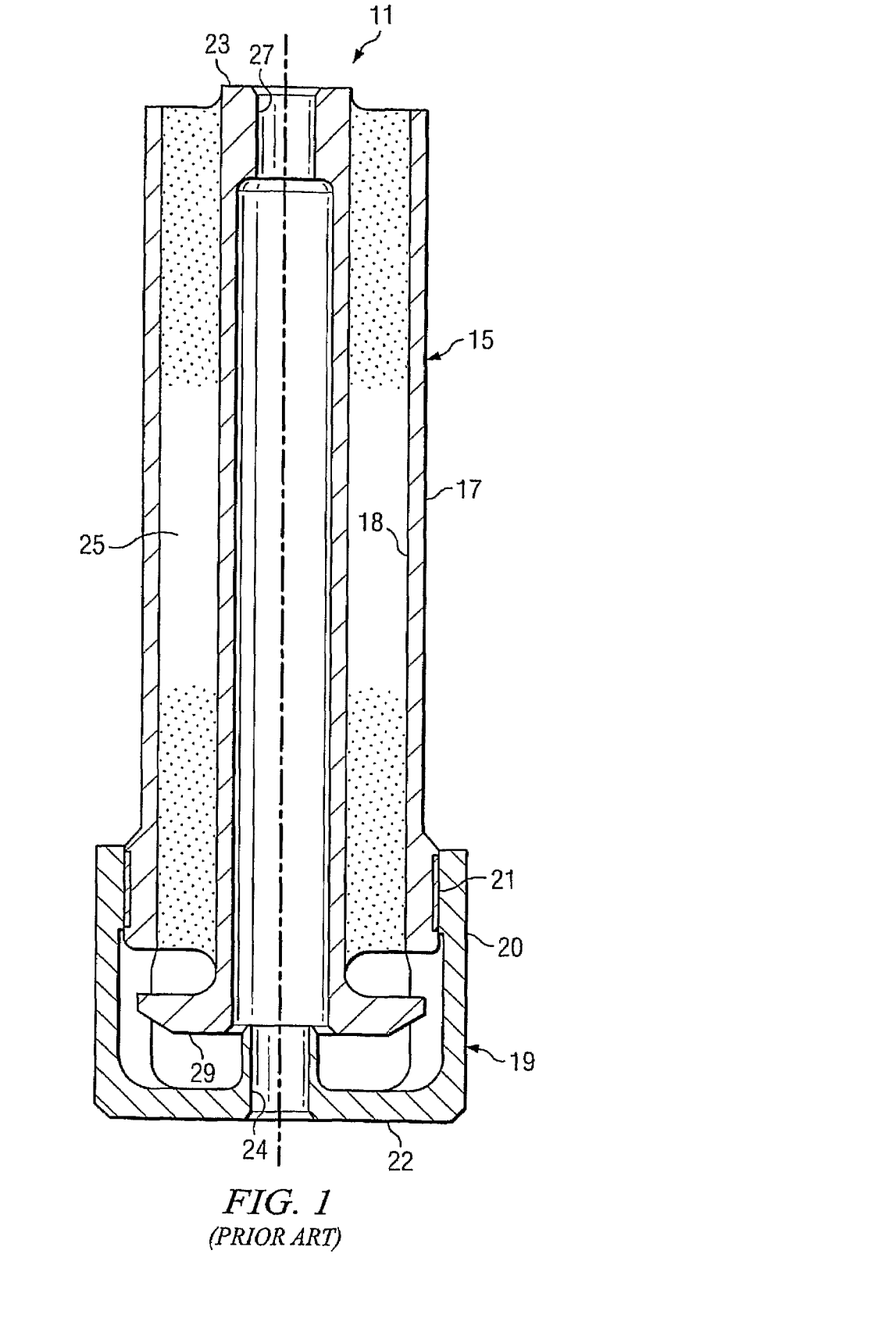
FIG. 1 is a cross-sectional side view of a prior-art elastomeric spring-damper.

Referring to FIG. 1 in the drawings, a prior-art cylindrical spring-damper 11 is illustrated. Spring-damper 11 has a two-piece outer housing 15 consisting of a body 17 and a cap 19. Body 17 includes a base portion 18, and cap 19 is coupled to body 17 at a joint 21, which is typically either a threaded joint or press fit joint. Cap 19 includes a generally cylindrical wall portion 20, a base portion 22, and an attachment port 24. As shown in FIG. 1, attachment port 24 extends into the interior of cap 19. An inner member 23 is carried within and coupled to body 17 via a resilient elastomeric member 25. Inner member 23 is typically formed as an elongated shaft having an attachment port 27 at one end and a stop flange 29 at the opposing end. Elastomeric member 25 allows inner member 23 to translate longitudinally relative to housing 15. However, the motion of inner member 23 is limited by contact between stop flange 29 and base portion 18 of body 17 when moving in the direction of body 17, and by contact between stop flange 29 and base portion 22 of cap 19 when moving in the direction of cap 19.

Various problems exist with spring-damper 11. Use of an exterior threaded or press fit interface causes spring-damper 11 to have a greater outer diameter at joint 21 than the diameter of the remainder of body 17. This greater diameter may present problems in the design and packaging of components connected to spring-damper 11. In addition, the increased size of cap 19 requires additional material, increasing the weight of cap 19. Furthermore, the design provides a poor interface for stress translation across joint 21 and may lead to increased maintenance and cost due to a greater number of parts.

Although great strides have been made in the art of cylindrical spring-dampers, significant shortcomings remain.

SUMMARY OF THE INVENTION

There is a need for an improved spring-damper having reduced width and integral stops for limiting movement of an inner member carried within the spring-damper.

Therefore, it is an object of the present invention to provide an improved spring-damper having reduced width and integral stops for limiting movement of an inner member carried within the spring-damper.

An elastomeric spring-damper has a one-piece tubular body having an integral cap. A tension stop flange is formed in the body near the cap portion, and a compression stop flange opposing the tension stop flange is formed on the cap portion. An inner member located within the body is coupled to the body with an annular elastomeric member, such that longitudinal motion of the inner member relative to the body is allowed through elastic deformation of the elastomeric member. An inner member stop flange is positioned between the compression stop flange and the tension stop flange to limit longitudinal motion of the inner member relative to the body.

The present invention provides for several advantages, including: (1) integral compression and/or tension stops; (2) reduced width; (3) reduced weight; (4) fewer components; and/or (5) improved ability for inspection of stop interfaces.

BRIEF DESCRIPTION OF THE DRAWINGS

For a more complete understanding of the present invention, including its features and advantages, reference is now made to the detailed description of the invention taken in conjunction with the accompanying drawings in which.

DESCRIPTION OF THE PREFERRED EMBODIMENT

The present invention provides an elastomeric spring, damper, or combination spring-damper assembly having integral compression and/or tension stops, reduced width, reduced weight, fewer components, and/or improved ability for inspection of stop interfaces. The assemblies have a rigid outer housing and a rigid inner member that can translate axially relative to the body, the housing and inner member each being adapted for connection to one of a pair of bodies that have relative motion. A resilient elastomeric member disposed between the outer housing and the inner member resists and damps the movement of the inner member, and this action resists and damps the relative motion of the attached bodies.

An assembly having an elastomeric member with a very low damping rate may be referred to as a spring, whereas an assembly having a very high damping rate may be referred to as a damper. An assembly having a damping rate between those of the springs and dampers may be referred to as a spring-damper, which acts in both capacities. For ease of description, the assemblies described herein are referred to as spring-dampers, though the descriptions can also be applied to elastomeric springs and dampers.

Figure 2A:
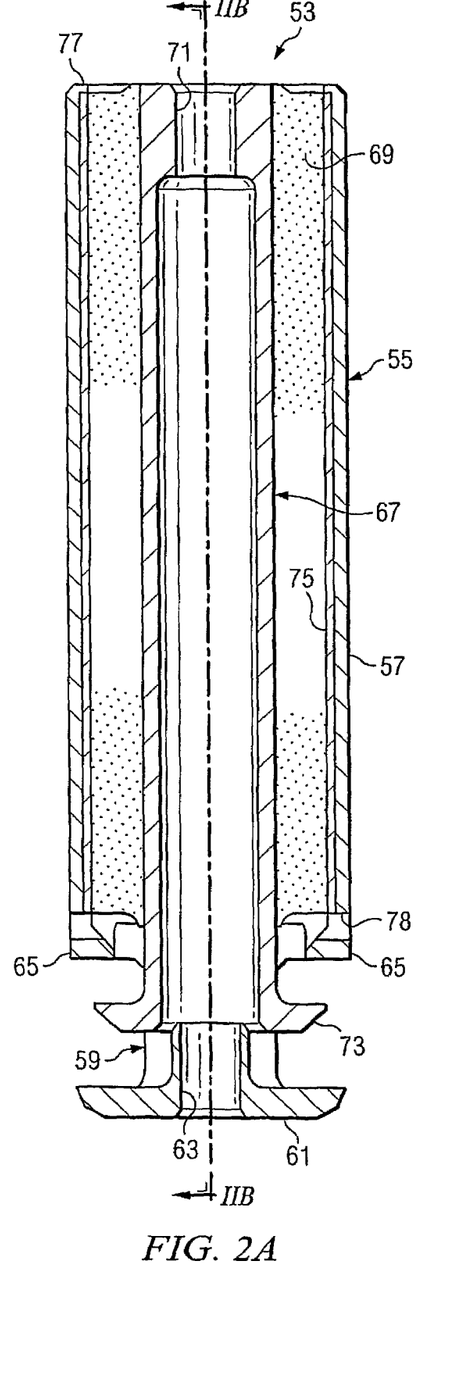
FIG. 2A is a cross-sectional side view of an elastomeric spring-damper according to the present invention.
Figure 2B:
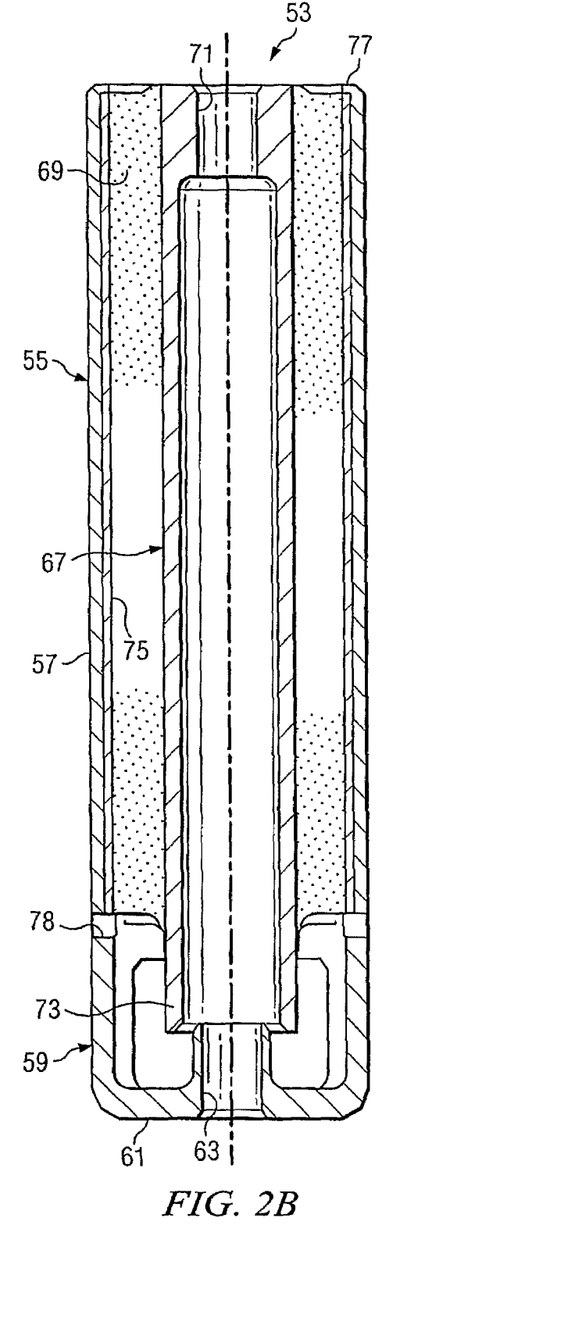
FIG. 2B is a cross-sectional side view of the elastomeric spring-damper of FIG. 2A sectioned along the section plane IIB-IIB.

FIGS. 2A and 2B illustrate the preferred embodiment of an improved spring-damper according to the present invention. Spring-damper 53 is shown in cross-sectional views in both figures, with spring-damper 53 being shown in FIG. 2B as rotated 90 degrees from the view in FIG. 2A and sectioned along the section plane IIB-IIB (as shown in FIG. 2A).

Referring to FIGS. 2A and 2B, spring-damper 53 has a one-piece outer housing 55 consisting of a body portion 57, a cap portion 59, a base portion 61, and an attachment port 63. As shown in the figures, attachment port 63 extends into the interior of cap portion 59, though attachment port 63 may protrude outwardly from cap portion 59. As shown, cap portion 59 forms a loop over the end of body 57, the loop having a narrow width section, which can be seen in FIG. 2A. This narrow section may form wrench flats, which allow cap portion 59 to be engaged by a wrench or other means. Cap portion 59 may be formed to have another configuration, such as an enclosed configuration which may include air or water relief apertures. Integral stop flanges 65 are located on opposing sides of the interior of cap portion 59, and each stop flange 65 extends for only a portion of the circumference of cap portion 59. Stop flange 65 in the rear is hidden by inner member 67 in FIG. 2B. This configuration provides for space between stop flanges 65 along the circumference of cap portion 59.

An inner member 67 is carried within and coupled to body portion 57 via a resilient elastomeric member 69. Inner member 67 is typically formed as an elongated shaft having an attachment port 71 at one end and a generally rectangular stop flange 73 at the opposing end. Elastomeric member 69 is preferably formed on or attached to inner member 67 prior to installation of inner member 67 and elastomeric member 69 in housing 55, and an optional sleeve 75 is preferably bonded to the outer surface of member 69. To retain elastomeric member 69 and inner member 67 in housing 55, the size of the end of body portion 57 opposite cap portion 59 is reduced in size, such as by crimping or rolling. For example, the end of body 57 of spring-damper 53 is shown as having been rolled to form a circumferential lip 77 that engages the corresponding end of sleeve 75 for preventing sleeve 75, and therefore member 69 and inner member 67, from exiting housing 55 through the rolled end of housing 55. Elastomeric member 69 is further kept in position within housing 55 by a ledge (not shown) formed in housing 55 between optional apertures 78, the ledge engaging the end of sleeve 75. Alternatively, the ledge may be a circumferential ring. In addition or alternatively, elastomeric member 69 may be retained within body portion 57 by swaging, or crushing, of body portion 57, bonding of elastomeric member 69 to the interior of body portion 57, or a combination of two or more of the described methods or other appropriate methods. Sleeve 75 may also be retained in position within body portion 57 by bonding or with detents, internal fasteners, fasteners inserted from outside body portion 57, cooperating threaded portions, or any other suitable means of retention.

Inner member 67 is allowed to translate longitudinally relative to and within housing 55 through elastic deformation of member 69. However, the motion of inner member 67 is restricted by contact between stop flange 73 and base portion 61 of cap portion 59 when moving in the compression direction (movement toward base portion 61) and by contact between stop flange 73 and stop flanges 65 of cap portion 59 when moving in the tension direction (movement away from base portion 61). Inner member 67 will typically be installed in a nominal axial position within housing 55, such that stop flange 73 is spaced from stop flanges 65 and base portion 61 of cap 59, allowing for travel of inner member 67 in both the compression and tension directions. The nominal position may position stop flange 73 approximately equidistant between stop flanges 65 and base portion 61, or stop flange may be positioned to allow for a greater amount of travel of inner member 67 in one direction than in the other direction.

As shown in FIGS. 2A and 2B, stop flange 73 has a greater lateral width in the section plane of FIG. 2A than in the section plane of FIG. 2B. The reduced width in the plane of FIG. 2B allows for stop flange 73 of inner member 67 to move past stop flanges 65 of cap portion 59 during assembly or disassembly of spring-damper 53 by rotating inner member 67 approximately 90 degrees from the orientation shown. During assembly, inner member 67 is rotated approximately 90 degrees from the orientation shown, inserted into housing 55, and again rotated approximately 90 degrees once stop flange 73 moves past stop flanges 65, rotationally positioning the wider portions of stop flange 73 to allow stop flange 73 to engage stop flanges 65.

To assemble spring-damper 53, elastomeric member 69 is preferably formed on or attached to inner member 67, and sleeve 75 is preferably bonded on the outer surface of member 69. The assembly comprising inner member 67, elastomeric member 69, and sleeve 75 is inserted into the open end of body 57 opposite cap portion 59. During insertion, the inner-member assembly is rotationally oriented so that stop flange 73 of inner member 67 can pass between stop flanges 65 on cap portion 59, then the assembly is rotated approximately 90 degrees to permit engagement of stop flange 73 and stop flanges 65. The end of housing 55 is preferably crimped or rolled to form lip 77 to engage the end of sleeve 75 to retain the inner-member assembly. Body 57 may also be swaged to aid in retaining the inner-member assembly within housing 55. Additional alternative methods for installing and retaining elastomeric member 69 include member 69 being formed on or bonded directly to inner member 67 and to body 57 simultaneously or member 69 being formed on or bonded to inner member 67 and afterward being bonded to body 57.

In operation, attachment port 63 is connected to one of a pair of bodies (not shown) having relative motion between the bodies, and attachment port 71 is attached to the other of the bodies. Ports 63, 71 may be attached to the corresponding bodies using rods, rod ends, or similar means that fixedly connect to ports 63, 71, such as with a threaded engagement, press fit, or other suitable methods of connection. As the bodies move relative to each other, inner member 67 and the inner surface of elastomeric member 69 are moved relative to housing 55, and this causes elastic deformation of elastomeric member 69 because the outer surface is retained in position relative to housing 55. Member 69 provides a spring force and damping force inherent within the material from which member 69 is formed that opposes the movement of inner member 67 from the installed position and damps oscillations in the relative movement.

Spring-damper 53 provides several advantages, including: 1) a one-piece body design that eliminates threaded or press-fit connections of the cap portion to the body portion; 2) integral compression and tension stops; 3) improved ability to inspect the elastomeric member and the compression and tension stops for wear or adjustment; 4) reduced width; 5) fewer parts; 6) lower weight; and 7) the ability to assemble spring-damper 53 using improved methods.

Figure 3:
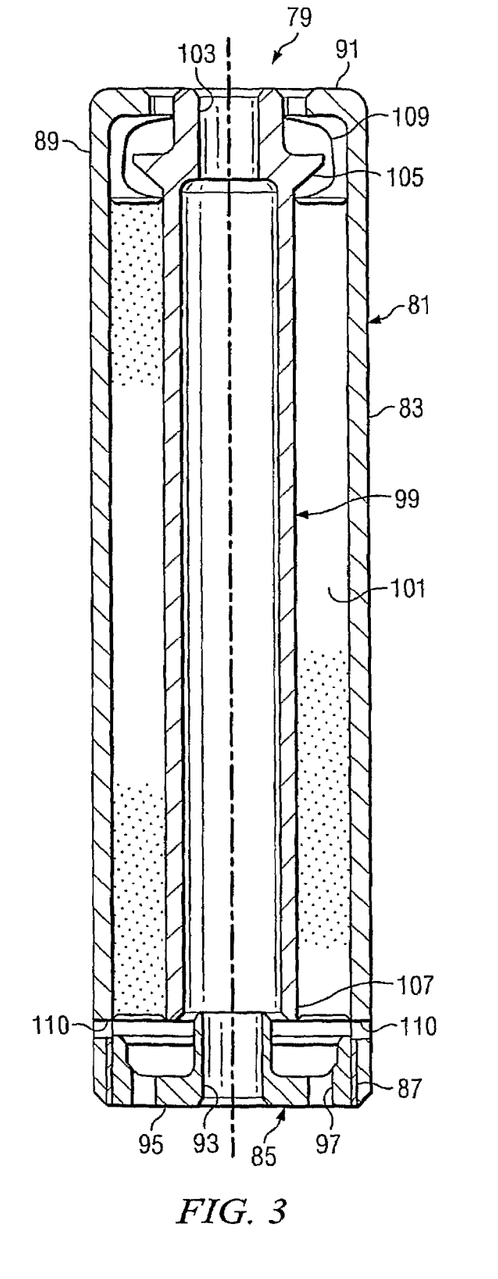
FIG. 3 is a cross-sectional side view of an alternative embodiment of an elastomeric spring-damper according to the present invention.

Referring now to FIG. 3, an alternative embodiment of a spring-damper according to the invention is illustrated. Spring-damper 79 has a two-piece outer housing 81 consisting of a body 83 and an internal plug 85, which is coupled to body 83 at joint 87. Joint 87 is typically either a threaded or press-fit joint, though plug 85 may be coupled to body 83 using any suitable means. Body 83 has an integral cap portion 89 terminating in a tension stop flange 91. In an alternative embodiment, stop flange 91 may be formed as a separate portion and then attached to housing 83.

Plug 85 has an attachment port 93 preferably extending inward within housing 81, though port 93 may alternatively protrude outwardly from plug 85. An integral compression stop flange 95 is formed in plug 85, and plug 85 preferably incorporates passages 97 for allowing air and/or water to pass through plug 85 or for allowing inspections of elastomeric member 101, stop flange 95, and base 107.

An inner member 99 is carried within and coupled to body 83 via a resilient elastomeric member 101. Inner member 99 is typically formed as an elongated shaft having an attachment port 103 at one end and a tension stop flange 105 at the same end. Elastomeric member 101 allows inner member 99 to translate longitudinally relative to housing 81. However, the motion of inner member 99 is restricted by contact between compression stop flange 95 and base portion 107 of inner member 99 when spring-damper 79 is under compression loads and by contact between tension stop flange 105 and stop flange 91 of cap 89 when spring-damper 79 is under tension loads.

Spring-damper 79 may be assembled by inserting inner member 99 into the end of body 83 opposite cap portion 89 and then forming elastomeric member 101 on or inserting and bonding member 101 to inner member 99 and the inner surface of body 83. Other methods of retaining member 101 may be used, such as swaging, etc., as described above, or a sleeve (like sleeve 75 in FIGS. 2A and 2B) may be formed on or attached to the outer surface of member 101. Plug 85 is then inserted within the open end of body 83 and attached to body 83 at joint 87, preferably with a threaded or press-fit configuration. Inner member 99 and elastomeric member 101 are preferably installed in a nominal position that provides inner member 99 with available travel in both the tension and compression directions. Elastomeric member 101 and tension stop flanges 91, 105 can be visually inspected through apertures 109, which may be a portion of wrench flats formed in cap portion 89. Elastomeric member 101, compression stop flange 95, and base portion 107 of inner member 99 may also be inspected through apertures 110 or similar apertures formed in body 83.

In operation, attachment port 93 is connected to one of a pair of bodies (not shown) having relative motion between the bodies, and attachment port 103 is attached to the other of the bodies. Ports 93, 103 may be attached to the corresponding bodies using rods, rod ends, or similar means that fixedly connect to ports 93, 103, such as with a threaded engagement, press fit, or other suitable methods of connection. As the bodies move relative to each other, inner member 99 and the inner surface of elastomeric member 101 are moved relative to housing 81, and this causes elastic deformation of elastomeric member 101 because the outer surface is retained in position relative to housing 81. Member 101 provides a spring force and a damping force inherent within the material from which member 101 is formed that opposes the movement of inner member 99 from the installed position and damps oscillations in the relative movement.

In an alternative configuration, spring-damper 79 may be formed to have one plug that provides a tension stop flange, the plug being located on the end of spring-damper 79 opposite plug 85, and an integral compression stop flange, which replaces plug 85.

Spring-damper 79 provides several advantages, including: 1) an improved ability to inspect the elastomeric member and the compression and tension stops for wear or adjustment; 2) reduced width; 3) lower weight; and 4) the ability to assemble spring-damper 79 using improved methods.

Figure 4:
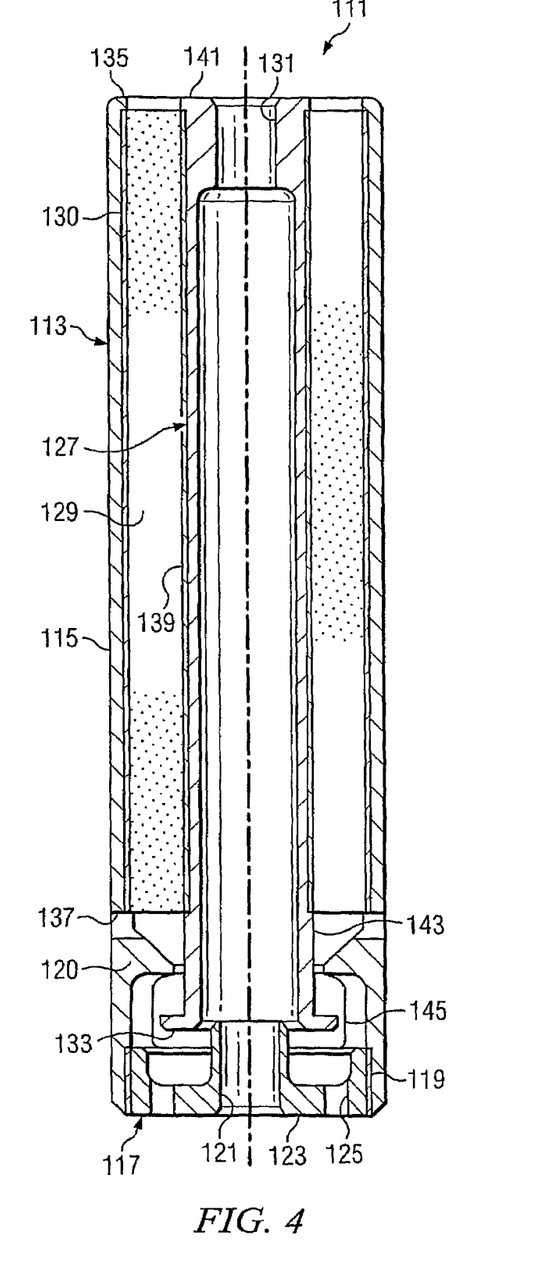
FIG. 4 is a cross-sectional side view of a second alternative embodiment of an elastomeric spring-damper according to the present invention.

Referring now to FIG. 4, a second alternative embodiment of a spring-damper according to the invention is illustrated. Spring-damper 111 has a two-piece outer housing 113 consisting of a body 115 and an internal plug 117, which is coupled to body 115 at joint 119. Joint 119 is typically either a threaded or press-fit joint, though plug 117 may be coupled to body 115 using any suitable means. Body 115 has an internal, preferably circumferential tension stop flange 120 formed near one end of body 115 and has an opposing open end.

Plug 117 is configured like plug 85, described above, with plug 117 having an attachment port 121 preferably extending inward within housing 113, though port 121 may alternatively protrude outwardly from plug 117. An integral compression stop flange 123 is formed in plug 117, and plug 117 preferably incorporates passages 125 for allowing air and/or water to pass through plug 117. Passages 125 also allow for inspection of stop flange 123 and stop flange 133.

An inner member 127 is carried within and coupled to body 115 via a resilient elastomeric member 129. An optional sleeve 130 may be formed on or bonded to the outer surface of member 129. Inner member 127 is typically formed as an elongated shaft having an attachment port 131 at one end and a stop flange 133 at the opposing end. Elastomeric member 129 allows inner member 127 to translate longitudinally relative to housing 113. However, the motion of inner member 127 is restricted by contact between compression stop flange 123 and stop flange 133 of inner member 99 when spring-damper 111 is under compression loads and by contact between tension stop flange 120 and stop flange 133 when spring-damper 111 is under tension loads. When using sleeve 130, the open end of body 115 may be crimped or rolled to form lip 135 for retaining sleeve 130 within body 115. Additionally, elastomeric member 129 may be kept in position within body 115 by a ledge (not shown) formed in body 115 between optional apertures 137 that engages the end of sleeve 130. Alternatively, the ledge may be a circumferential ring. Sleeve 130 may also be retained in position within body 115 with detents, internal fasteners, fasteners inserted from outside body 115, cooperating threaded portions, or any other suitable means of retention.

The embodiment shown in FIG. 4 is also shown with an optional inner sleeve 139 on which elastomeric member 129 is formed or bonded. Sleeve 139 is retained in position relative to inner member 127 by lip 141, formed on the end of inner member 127 surrounding attachment port 131, and by ledge 143 near the opposite end of inner member 127. This configuration, which may be used in any of the embodiments described above, eliminates the requirement that the inner surface of elastomeric member 129 be bonded to inner member 127.

To assemble a spring-damper 111 having integral circumferential tension stop flanges 120, 133, inner member 127 may only be inserted into body 115 through the end having stop flange 120. Alternatively, each circumferential stop flange 120, 133 may be formed as a separate component and installed before or after insertion of inner member 127. Elastomeric member 129 may be formed exterior of body 115 or formed within the volume in body 115 between inner member 127 and body 115 or between sleeves 130, 139, if present. Sleeves 130, 139 may alternatively be formed on or attached to member 129 prior to installation of the assembly of sleeves 130, 139 and member 129 in body 115 and/or on inner member 127. The open end of body 115 is then crimped to form lip 135 for retaining sleeve 130 within body 115. Additionally, body 115 may be swaged to retain elastomeric member 129 and sleeves 130, 139. Sleeve 130 may also be retained in position within body portion 115 with detents, internal fasteners, fasteners inserted from outside body portion 115, cooperating threaded portions, or any other suitable means of retention.

Plug 117 is inserted within the end of body 115 opposite lip 135 and attached to body 115 at joint 119, preferably with a threaded or press-fit configuration. Inner member 127 and elastomeric member 129 are preferably installed in a nominal position that provides inner member 127 with available travel in both the tension and compression directions. Stop flanges 120, 123, 133 and elastomeric member 129 can be visually inspected through apertures 145, which may be a portion of wrench flats formed in body 115.

In operation, attachment port 131 is connected to one of a pair of bodies (not shown) having relative motion between the bodies, and attachment port 121 is attached to the other of the bodies. Ports 121, 131 may be attached to the corresponding bodies using rods, rod ends, or similar means that fixedly connect to ports 121, 131, such as with a threaded engagement, press fit, or other suitable methods of connection. As the bodies move relative to each other, inner member 127 and the inner surface of elastomeric member 129 are moved relative to housing 113, and this causes elastic deformation of elastomeric member 129 because the outer surface is retained in position relative to housing 113. Member 129 provides a spring force and a damping force inherent within the material from which member 129 is formed that opposes the movement of inner member 127 from the installed position and damps oscillations in the relative movement.

Tension stop flange 120 may alternatively be configured like stop flanges 65 of spring-damper 53 in FIGS. 2A and 2B, wherein stop flange 120 comprises two stop flanges 120 extending only for a portion of the circumference of body 115, and stop flange 133 on inner member 127 may be configured like rectangular stop flange 73 of spring-damper 53. In this configuration, spring-damper 111 may optionally be assembled as described above, or inner member 127 may be inserted before or after installation of plug 117 in the end of body 115 opposite plug 117. During insertion, inner member is rotationally oriented to align the greater width of stop flange 133 with the spaces between stop flanges 120 until stop flange 133 passes stop flanges 120, then inner member is rotated approximately 90 degrees to rotationally position stop flange 133 for engagement with stop flanges 120. In this method of assembly, elastomeric member 129 may be formed on inner member 127 prior to insertion of inner member 127.

Spring-damper 111 provides several advantages, including: 1) an improved ability to inspect the compression and tension stops for wear or adjustment; 2) reduced width; 3) lower weight; and 4) the ability to assemble spring-damper 111 using improved methods.

Figure 5A:
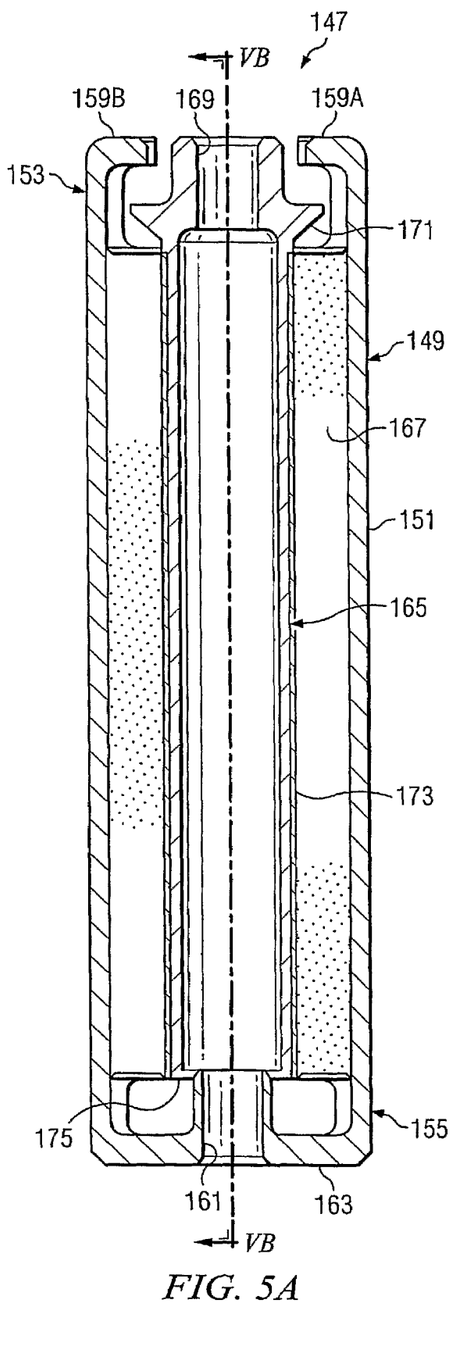
FIG. 5A is a cross-sectional side view of a third alternative embodiment of an elastomeric spring-damper according to the present invention.
Figure 5B:
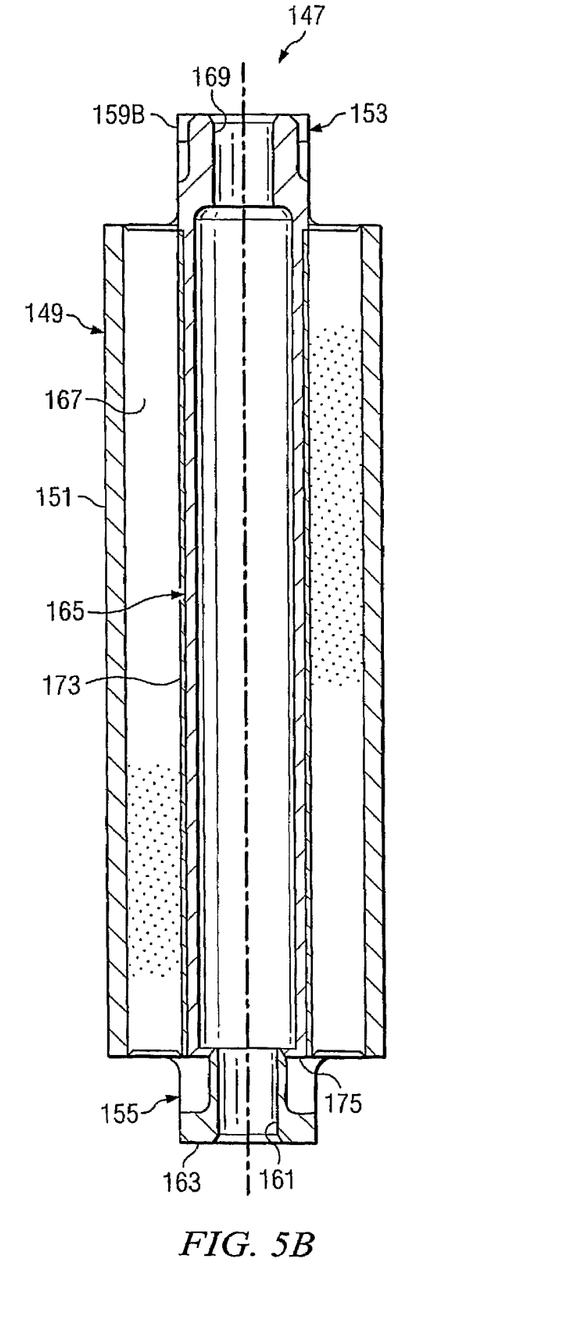
FIG. 5B is a cross-sectional side view of the elastomeric spring-damper of FIG. 5A sectioned along the section plane VB-VB.

FIGS. 5A and 5B illustrate another alternative embodiment of an improved spring-damper according to the present invention. Spring-damper 147 is shown in cross-sectional views in both figures, with spring-damper 147 being shown in FIG. 5B as rotated 90 degrees from the view in FIG. 5A and sectioned along the section plane VB-VB (as shown in FIG. 5A).

Referring to FIGS. 5A and 5B, spring-damper 147 has a one-piece outer housing 149 consisting of a body portion 151 and two opposing cap portions 153, 155. Cap portion 153 comprises tension stop flanges 159A, 159B, and cap portion 155 comprises an attachment port 161 and a base portion 163 that functions as a compression stop flange. As shown, cap portion 155 forms a narrow loop over the end of body 151, allowing cap portion 155 to be engaged by a wrench or other means, and cap portion 153 is similarly configured to allow for wrench flats. Cap portions 153, 155 may alternatively be formed to have other configurations, such as a fully or partially enclosed configuration which may include air or water relief apertures.

An inner member 165 is carried within and coupled to body portion 151 via a resilient elastomeric member 167. Inner member 165 is typically formed as an elongated shaft having an attachment port 169 and a rectangular stop flange 171 at the same end as port 169. Elastomeric member 167 is formed within body portion 151. An optional sleeve 173 may be used on inner member 165. To retain elastomeric member 167 and inner member 165 in housing 149, member 167 is bonded to body portion 151 and to inner member 165 (or sleeve 173, if present).

Inner member 165 is allowed to translate longitudinally relative to and within housing 149 through elastic deformation of member 167. However, the motion of inner member 165 is restricted by contact between base portion 163 and base 175 of inner member 165 when moving in the compression direction and by contact between stop flanges 159A, 159B and stop flange 171 when moving in the tension direction. Inner member 165 will typically be installed in a nominal axial position within housing 149 that allows for travel of inner member 165 in both the compression and tension directions. The nominal position may position inner member 165 to allow for approximately equidistant movement in both directions, or inner member may be positioned to allow for a greater amount of travel in one direction than in the other direction.

As shown in FIGS. 5A and 5B, stop flange 171 has a greater lateral width in the section plane of FIG. 5A than in the section plane of FIG. 5B. The reduced width in the plane of FIG. 5B allows for stop flange 171 to move past stop flanges 159A, 159B of cap portion 153 during assembly or disassembly of spring-damper 147 by rotating inner member 165 approximately 90 degrees from the orientation shown. During assembly, inner member 165 is rotated approximately 90 degrees from the orientation shown, inserted into housing 149, and again rotated approximately 90 degrees once stop flange 171 moves past stop flanges 159A, 159B, rotationally positioning the wider portions of stop flange 171 to allow stop flange 171 to engage stop flanges 159A, 159B. The reduced width of stop flange 171 also allows for inner member 165 to be engaged by a wrench or similar means on stop flange 171.

To assemble spring-damper 147, inner member 165 is inserted into housing 149 by rotationally orienting inner member 165 so that stop flange 171 can pass between stop flanges 159A, 159B on cap portion 153, then inner member 165 is rotated approximately 90 degrees to permit engagement of stop flange 171 and stop flanges 159A, 159B. Elastomeric member 167 is then formed within housing 149 in the volume between inner member 165 and body portion 151, such that member 167 is bonded to body portion 151 and inner member 165 (or sleeve 173, if present). Body portion 151 may also be swaged, and additional or alternative appropriate methods may be used to assist in retaining member 167.

In operation, attachment ports 161, 169 are each connected to one of a pair of bodies (not shown) having relative motion between the bodies. Ports 161, 169 may be attached to the corresponding bodies using rods, rod ends, or similar means that fixedly connect to ports 161, 169, such as with a threaded engagement, press fit, or other suitable methods of connection. As the bodies move relative to each other, inner member 165 and the inner surface of elastomeric member 167 are moved relative to housing 149, and this causes elastic deformation of elastomeric member 167 because the outer surface is retained in position relative to housing 149. Member 167 provides a spring force and damping force inherent within the material from which member 167 is formed that opposes the movement of inner member 165 from the installed position and damps oscillations in the relative movement.

Spring-damper 147 provides several advantages, including: 1) a one-piece body design that eliminates threaded or press-fit connections of the cap portion to the body portion; 2) integral compression and tension stops; 3) improved ability to inspect the elastomeric member and the compression and tension stops for wear or adjustment; 4) reduced width; 5) fewer parts; 6) lower weight; and 7) the ability to assemble spring-damper 147 using improved methods.

Each of the embodiments is shown as a cylindrical spring-damper, though any of the embodiments could be modified to have other suitable cross-sectional shapes. Also, in all embodiments attachment ports may extend internally, as shown, and/or may be configured to extend externally. Alternatively, the inner members and/or outer housings may each be formed as an integral extension of a larger component, such that an attachment port is unnecessary. The interface of tension and compression stops, such as cooperating stop flanges, may be configured to have planar, conical, spherical, or other suitable shapes.

The present invention provides for several advantages, including: (1) integral compression and/or tension stops; (2) reduced width; (3) reduced weight; (4) fewer components; and/or (5) improved ability for inspection of stop interfaces.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. An elastomeric spring-damper, comprising:
   a one-piece tubular body having an integral cap portion, the body having an integral stop flange formed in the body near the cap portion, the cap portion having a base portion opposing the integral stop flange;
   an inner member located within the body and coupled to the body with an annular elastomeric member, the inner surface of the elastomeric member being affixed relative to the inner member and the outer surface of the elastomeric member being affixed relative to the body, such that longitudinal motion of the inner member relative to the body is allowed through elastic deformation of the elastomeric member; and
   an inner member stop flange located on the inner member and positioned between the base portion and the integral stop flange, such that a distance of the longitudinal motion of the inner member relative to the body is limited by contact of the inner member stop flange with the base portion in one direction of motion and contact with the integral stop flange in an opposite direction of motion;
   wherein the integral stop flange is formed as flange portions spaced from each other extending radially inward;
   wherein the inner member stop flange is formed to have a peripheral shape;
   wherein the inner member stop flange is configured to come into contact with the integral stop flange when oriented at a first orientation; and
   wherein the inner member stop flange is inserted into an open end of the body opposite the integral cap portion, the inner member stop flange is configured to move past the integral stop flange as the inner member stop flange is oriented at a second orientation, so as to enable disassembly and assembly as the inner member stop flange is oriented between the first and the second orientation.

2. The spring-damper according to claim 1, wherein at least one of the body and the inner member has an attachment port adapted for attachment to an object that is capable of motion relative to the other of the body and the inner member.

3. The spring-damper according to claim 1, wherein each of the body and the inner member has an attachment port adapted for attachment to one of a pair of objects that are capable of relative motion.

4. The spring-damper according to claim 1, further comprising:
   a sleeve affixed to one of the inner surface and the outer surface of the elastomeric member, and wherein the elastomeric member is affixed relative to an adjacent one of the body and the inner member by retention of the sleeve in a fixed position relative to the adjacent one of the body and the inner member.

5. The spring-damper according to claim 1, wherein the cap portion is formed as a loop extending from the body.

* * * * *